(12) United States Patent
Shwartz et al.

(10) Patent No.: US 11,474,954 B2
(45) Date of Patent: Oct. 18, 2022

(54) CACHE UNIT USEFUL FOR SECURE EXECUTION

(71) Applicant: TECHNION RESEARCH & DEVELOPMENT FOUNDATION LTD., Haifa (IL)

(72) Inventors: Ofir Shwartz, Haifa (IL); Yitzhak Birk, Hod Hasharon (IL)

(73) Assignee: TECHNION RESEARCH & DEVELOPMENT FOUNDATION LTD., Haifa (IL)

( * ) Notice: Subject to any disclaimer, the term of this patent is extended or adjusted under 35 U.S.C. 154(b) by 465 days.

(21) Appl. No.: 16/625,018

(22) PCT Filed: Jun. 3, 2018

(86) PCT No.: PCT/IL2018/050598
§ 371 (c)(1),
(2) Date: Dec. 20, 2019

(87) PCT Pub. No.: WO2018/235068
PCT Pub. Date: Dec. 27, 2018

(65) Prior Publication Data
US 2020/0151112 A1    May 14, 2020

Related U.S. Application Data

(63) Continuation of application No. 15/629,978, filed on Jun. 22, 2017, now abandoned.

(51) Int. Cl.
*G06F 12/12* (2016.01)
*G06F 12/128* (2016.01)
(Continued)

(52) U.S. Cl.
CPC ........ *G06F 12/128* (2013.01); *G06F 12/0808* (2013.01); *G06F 12/0862* (2013.01);
(Continued)

(58) Field of Classification Search
CPC ..................................................... G06F 12/128
(Continued)

(56) References Cited

U.S. PATENT DOCUMENTS

2008/0294848 A1    11/2008  Harris et al.
2010/0332850 A1    12/2010  Boivie
(Continued)

FOREIGN PATENT DOCUMENTS

JP    2010231623 A    10/2010

OTHER PUBLICATIONS

Pieter Maene et al, Hardware-Based Trusted Computing Architectures for Isolation and Attestation, IEEE Transactions on Computers, vol. 67, No. 3, Jan. 8, 2017, pp. 361-374, XP055544908, USA.
(Continued)

*Primary Examiner* — Jae U Yu
(74) *Attorney, Agent, or Firm* — Tutunjian & Bitetto, P.C.

(57) ABSTRACT

A cache unit that is configured to retain: a plurality of cache blocks; a plurality of owner indicators, and a plurality of validity marks. For each cache block of the plurality of cache blocks exists a corresponding owner indicator in the plurality of owner indicators. An owner indicator corresponding to a cache block is capable of identifying an entity that caused the cache block to be fetched to the cache unit. For each cache block of the plurality of cache blocks exists a corresponding validity mark in the plurality of validity marks. A validity mark corresponding to the cache block indicates whether a validation process performed on the cache block upon fetching thereof was successful. The cache unit may be useful for secure execution.

23 Claims, 7 Drawing Sheets

(51) Int. Cl.
*G06F 12/0808* (2016.01)
*G06F 12/0875* (2016.01)
*G06F 12/0862* (2016.01)
*G06F 21/55* (2013.01)
*G06F 21/52* (2013.01)
*G06F 12/14* (2006.01)
*G06F 21/62* (2013.01)

(52) U.S. Cl.
CPC ...... *G06F 12/0875* (2013.01); *G06F 12/1408* (2013.01); *G06F 21/52* (2013.01); *G06F 21/55* (2013.01); *G06F 21/62* (2013.01); *G06F 2212/1052* (2013.01); *G06F 2212/402* (2013.01); *G06F 2212/452* (2013.01); *G06F 2212/601* (2013.01); *G06F 2212/602* (2013.01); *G06F 2212/621* (2013.01)

(58) Field of Classification Search
USPC ........................................................ 711/125
See application file for complete search history.

(56) References Cited

U.S. PATENT DOCUMENTS

2013/0013729 A1   1/2013   Bennett
2016/0171250 A1*  6/2016   Boivie .................. G06F 21/53
                                                        713/189
2016/0246736 A1   8/2016   Lee et al.

OTHER PUBLICATIONS

Supplemental European Search Report from 18820143.8/ EP3642721A4 dated May 25, 2021, 14 pgs.
B. Gassend, et al, Caches and Hash Trees for Efficient Memory Integrity Verification, The Ninth International Symposium on High-Performance Computer Architecture, 2003. HPCA-9 2003. Proceedings, Feb. 28, 2003. IEEE.

* cited by examiner

CACHE UNIT USEFUL FOR SECURE EXECUTION

CROSS-REFERENCE TO RELATED APPLICATION

This application claims the benefit of U.S. application Ser. No. 15/629,978 filed Jun. 22, 2017, entitled "A CACHE UNIT USEFUL FOR SECURE EXECUTION", which is hereby incorporated by reference in its entirety without giving rise to disavowment.

TECHNICAL FIELD

The present disclosure relates to computing in general, and to secure computing in a potentially untrusted environment, in particular.

BACKGROUND

In current computing environments, many programs are being executed on servers, other remote computing devices, or other remote execution platforms, such as part of the cloud. The user sends a program, comprising code and data, for execution. It can be provided, for example, as files on a disk or via a network, and program output is collected similarly. In some cases, the program may be installed once and works perpetually, possibility sending back output to the user from time to time. The computation tasks entrusted with such remote execution platforms may include processing of confidential or otherwise sensitive data, that sometimes should not be divulged, and while ensuring that the data is not manipulated or altered by another. In some cases, the program itself may contain trade secrets, such as confidential algorithms. The program should therefore not be viewable by unauthorized entities. Furthermore, unauthorized entities should not be allowed to alter the program itself.

The remote execution platform may serve concurrently multiple users and execute their respective programs. A user cannot trust that other users will not attempt to gain access to her sensitive data, such as by manipulating their software to access its data. Furthermore, any other software being executed on the execution platform, even if provided with unrestricted permissions, is also not to be trusted. The Operating System (OS), hypervisor, Virtual Machine Monitor (VMM) cannot be trusted, such as in case of an execution platform offered by an untrusted vendor.

Secure execution platforms are currently provided, where the owner of the platform is not trusted, but the processor's manufacturer is. Intel™ Software Guard Extensions (SGX)™ is an example of such a hardware-based solution providing a secure execution platform. However, SGX directly supports only programs written especially for it, and suffers from performance and scalability problems, and lack of support of conventional programs and programming models (e.g. conventional multi-threading).

BRIEF SUMMARY

One exemplary embodiment of the disclosed subject matter is a cache unit comprising computer readable medium, wherein said cache unit is configured to retain: a plurality of cache blocks; a plurality of owner indicators, wherein for each cache block of the plurality of cache blocks exists a corresponding owner indicator in the plurality of owner indicators, wherein an owner indicator corresponding to a cache block is capable of identifying an entity that caused the cache block to be fetched to the cache unit; and a plurality of validity marks, wherein for each cache block of the plurality of cache blocks exists a corresponding validity mark in the plurality of validity marks, wherein a validity mark corresponding to the cache block indicates whether a validation process performed on the cache block upon fetching thereof was successful.

Optionally, a first dataset and a second dataset concurrently reside unencrypted in the plurality of cache blocks, wherein the first dataset is associated with a first entity, wherein the second dataset is associated with a second entity, wherein the second entity is prohibited from accessing the first dataset.

Optionally, the first entity is prohibited from accessing the second dataset.

Optionally, the first dataset comprises one or more cache blocks comprising program instructions that are to be executed by the first entity, and wherein the first dataset comprises one or more cache blocks comprising data that is written by the first entity.

Optionally, a key storage may retain a plurality of keys, each of which is associated with a different entity, wherein the validation process is performed using a key retained in the key storage, wherein the key is associated with the entity, wherein the key storage and the plurality of cache blocks are retained in a secure storage. Optionally, the secure storage is may by on the processor, off-the processor, or the like.

Optionally, a Security Management Unit (SMU) comprised by an apparatus which comprises the cache unit, is configured to perform the validation process upon fetching of a cache block into the cache unit.

Optionally, said SMU is further configured to sign a cache block upon cache block eviction from the cache unit to produce a signature, wherein the validation process is based on the signature produced by said SMU upon eviction.

Optionally, said SMU is configured to utilize the plurality of owner indicators and the plurality of validity marks to enforce access privileges to the plurality of cache blocks.

Optionally, said SMU is configured to bypass the access privileges in response to receiving an instruction for execution selected from a list of secure instructions.

Optionally, wherein the list of secure instructions comprises: a secure store instruction configured to store data in a manner allowing it to be accessible in security domains different than a security domain in which the secure store instruction is executed; a secure load instruction configured to load data stored in security domains different than a security domain in which the secure load instruction is executed; and an initialization instruction configured to initialize allocated memory to be used by an entity executing the initialization instruction.

Optionally, said SMU is configured to enforce access privileges that couple instructions and data retained in the plurality of cache blocks using the plurality of owner indicators and the plurality of validity marks.

Optionally, said SMU is configured to assign and set values to the plurality of validity marks and to the plurality of owner indicators during fetching of corresponding data blocks into said cache unit, wherein said SMU is configured to encrypt a cache block upon eviction from said cache unit into a computer-useable medium, and wherein said SMU is configured to decrypt a data unit upon fetching the data unit from the computer-useable medium into said cache unit.

Optionally, said SMU is configured to encrypt the cache block upon eviction from said cache unit only in response to the cache block being associated with a validity mark indicating a successful validation process of the cache block.

Optionally, an execution unit comprised by an apparatus which comprises the cache unit, comprises a set of registers for retaining values, wherein the set of registers are configured to be used during execution of instructions by said execution unit. Said execution unit is configured to receive an instruction, an instruction validity mark, and an instruction owner indicator, wherein the instruction is an instruction to be executed by said execution unit and configured to read from a cache block in the plurality of cache blocks, wherein the instruction validity mark is a validity mark that corresponds the cache block, and wherein the instruction owner indicator is an owner indicator that corresponds the cache block; and wherein said execution unit is configured to erase content in at least a portion of the set of registers based on at least one of the instruction validity mark and the instruction owner indicator.

Optionally, the execution unit is configured to erase the content in at least a portion of the set of registers based on the instruction validity mark indicating an unsuccessful validation process of the instruction.

Optionally, said execution unit is configured to erase the content in at least a portion of the set of registers based on the instruction owner indicator indicating a different owner than a second instruction owner indicator associated with a previous instruction preceding the instruction.

Optionally, said execution unit is configured to copy the content of the at least a portion of the set of registers to a secure storage prior to erasing the content, wherein said execution unit is configured to restore the content of the at least a portion of the set of registers from said secure storage in response to receiving a second instruction, a second instruction validity mark and a second owner indicator, based on the second instruction validity mark indicating a successful validation process of the second instruction and based on the second owner indicator indicating a same owner as a third owner indicator that is associated with a third instruction preceding the instruction.

Optionally, said execution unit is configured to verify that an attribute of the second instruction matches an expected attribute, before restoring the content of the at least a portion of the set of registers.

Optionally, the attribute of the second instruction is an address of the second instruction, and wherein the expected attribute is an expected next address.

Optionally, the content is values of a proper subset of the set of registers, whereby protecting values of a portion of the set of registers excluding the proper subset from being accessed by unauthorized instructions, and whereby enabling passing of arguments from secure domain to unsecure domain via the proper subset.

Another exemplary embodiment of the disclosed subject matter is a method comprising: obtaining an instruction for execution from a first cache block; obtaining a first validity mark and a first owner indicator associated with the first cache block; in response to the instruction, when executed, attempting to access a second cache block: obtaining a second validity mark and a second owner indicator associated with the second cache block; determining an access privilege of the instruction to the second cache block based on at least two of the first validity mark, the first owner indicator, the second validity mark and the second owner indicator; and enforcing the access privilege.

Optionally, said determining the access privilege comprises determining to prevent access in response to at least one of the following: the first validity mark and the second validity mark indicate successful validation and the first owner indicator is different than the second owner indicator; the first validity mark indicates unsuccessful validation and the second validity mark indicates successful validation; and the first validity mark indicates successful validation, the second validity mark indicates unsuccessful validation and the instruction is not selected from a predetermined group of secure instructions.

Yet another exemplary embodiment of the disclosed subject matter is a method performed by a processor, wherein the processor comprising a cache unit retaining a plurality of cache blocks and a set of registers, wherein said method comprising: obtaining a first instruction for execution from a first cache block; obtaining a first validity mark and a first owner indicator associated with the first cache block; determining a first security domain based on the first validity mark and the first owner indicator; executing the first instruction to set a first state of the processor; obtaining a second instruction for execution from a second cache block; obtaining a second validity mark and a second owner indicator associated with the second cache block; determining a second security domain based on the second validity mark and the second owner indicator; in response to determining the second security domain is different than the first security domain: storing, in a secure storage, content of at least a portion of the set of registers; storing, in a secure storage, an address of next instruction in the first security domain; and after said storing content and storing the address, modifying the content of the at least a portion of the set of registers; after said modifying, executing the second instruction to set a second state of the processor; obtaining a third instruction for execution from a third cache block; obtaining a third validity mark and a third owner indicator associated with the third cache block; determining a third security domain based on the third validity mark and the third owner indicator; in response to determining the third security domain is the first security domain: restoring, from the secure storage, the content of the at least portion of the set of registers, thereby restoring the first state of the execution unit; and verifying an address of the third instruction matches the address of the next instruction in the first security domain retained in the secure storage; and executing the third instruction on the first state of the execution unit.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
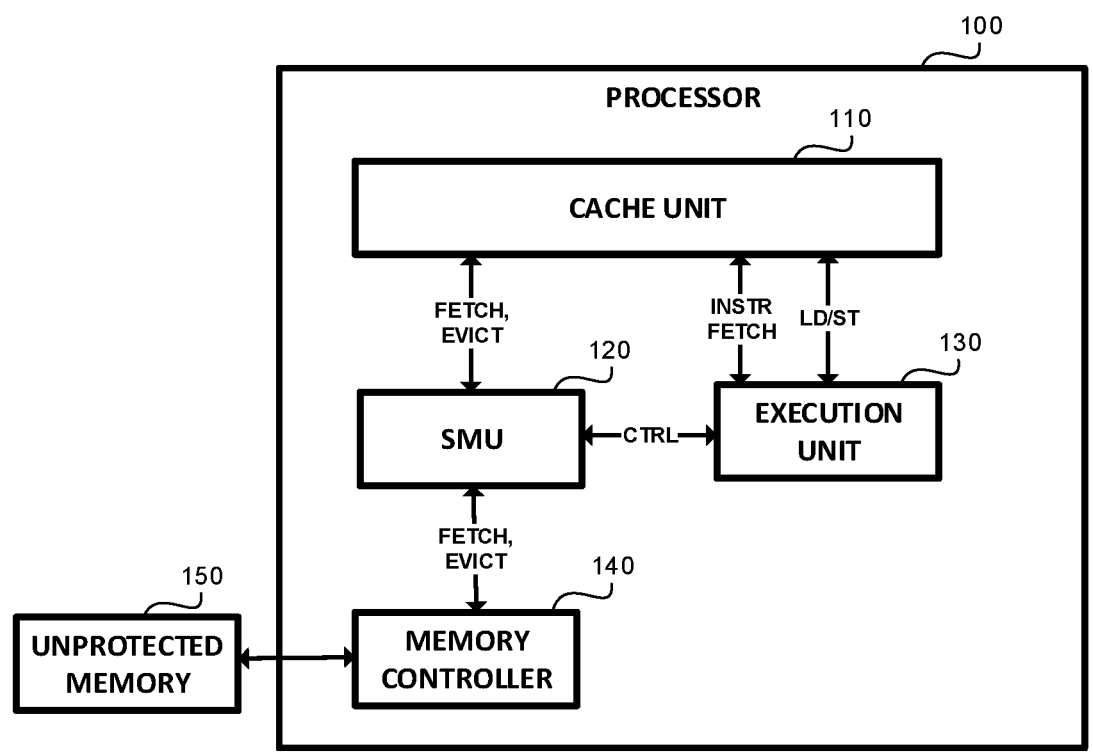
FIG. 1 shows a block diagram of an apparatus, in accordance with some exemplary embodiments of the disclosed subject matter.

One technical problem dealt with by the disclosed subject matter is to protect data used by a processor or generated thereby, such as cached data, against forbidden access. In some cases, a shared execution platform may be used. The shared execution platform may execute malicious software at the same time a user-program is being executed. The malicious software can potentially have any software-based privileges, may be part of the Operating System (OS), may operate in kernel mode with administrator permissions, may be implemented as part of the VMM or hypervisor, or the like. In some cases, the owner of the shared execution platform herself may be untrusted and she may be assumed to try to or assist in attacking the executed code, such as reading the code, altering the code, accessing or modifying data used by the code, or the like.

In some exemplary embodiments, only the hardware or a specific hardware component, such as a processor, may be trusted in the shared execution platform. It may be desired to protect the integrity of an application running on the shared machine, even if that machine is compromised or otherwise untrusted. The integrity of the application may be protected by detecting alterations of the application itself or the data used by the application. In some cases, it may be further desired to protect the confidentiality of the data being processed by the application, the confidentiality of the application, or the like.

Another technical problem dealt with by the disclosed subject matter is to enable a secure execution platform providing tamper detection and prevent access to the code or data used or produced by a program, in an efficient manner. Some naïve solutions adversely affect performance of the secure execution platform, such as by incurring significant area and processing overhead. In one naïve solution, protected data and code are transferred to a secure dedicated memory region. However, such a solution requires migrating data back and forth from the secure memory region to other regions specifically for the purpose of providing secure execution, and provides for a coarse granularity of protection, such as assuming a same permission to all data and code retained in the dedicated memory region at the same time.

Yet another technical problem dealt with by the disclosed subject matter is to provide for a secure execution platform that can execute general code and would not require manually using of a specific instruction set associated therewith, or manually introducing security-instruction into the code itself, forcing the programmer to consider security aspects associated with the secure execution platform.

One technical solution provided by the disclosed subject matter is a cache unit to be used in a secure execution platform. The cache unit may be a computer-readable medium used by a processor, such as for retaining data used in the processing or for storing results of the processing. The disclosed subject matter is not limited to CPU cache, but for simplicity of the disclosure, the specification focuses on such embodiment. The CPU cache may retain data that is fetched from memory to be processed by the processor, and retains outputs of the processor before being stored in other memory regions, such as RAM memory or persistent storage.

In some exemplary embodiments, the cache unit may retain metadata at cache block granularity. Each cache block is associated with an Owner Identifier (CH) and a Validation Mark (VM).

The OI indicates which entity is responsible for a cache block. For example, which process has written the data into the cache block, whose program code is retained in the cache block, or the like. The OI may be, for example, a process identifier.

In some exemplary embodiments, the VM may indicate whether a key-based validation process of the cache block was successful. The key-based validation process may utilize a key associated with the owner of the cache block. In some exemplary embodiments, a cache block may be signed when evicted from the secure cache to unsecure memory. The signature may utilize a secret key and may be based on the content of the cache block, address (virtual or physical) used to determine the placement and location of the block outside the cache (e.g., when evicting the block or when fetching), or the like. In some exemplary embodiments, the signature of the cache block may be later used, when the same block is fetched back into the cache, to validate the content of the block was not tampered with. In some exemplary embodiments, the VM may be a one bit flag that is either set (e.g., 1) if the validation process was successful or unset (e.g., 0), if the validation process failed. In some exemplary embodiments, some of the cache blocks retained in the cache unit may not be associated with secure programs. For such cache blocks, the OI may indicate that they are not protected, they may not have an associated secret key, the VM may be constantly set to 0, or the like.

In some exemplary embodiments, an embodiment may utilize a combined metadata variable to indicate values of both OI an VM, such as using a byte to represent OI and having a predetermined value, such as 0 represent false VM and otherwise VM is deemed as true. In accordance with the disclosed subject matter, such an embodiment may still be viewed as comprising both a VM and OI although such metadata is represented using a combined single variable.

In some exemplary embodiments, the OI and VM cannot be forged. Their content is examined by trusted hardware, retained in secure storage locations that are only accessible to the trusted hardware. In some exemplary embodiments, the marks may be generated using a cryptographic mechanism.

In some exemplary embodiments, a hardware device, such as a Central Processing Unit (CPU), an Integrated Circuit (IC), a processor, or the like, in accordance with the disclosed subject matter may comprise the cache unit. The hardware device may be configured to automatically hide register values on a first invocation of an untrusted instruction, thereby protecting the register values of protected code. The register values may be restored when a next trusted instruction is performed. As the hardware unit handles the hiding of the register values, it does not rely on an OS to perform such actions upon context switches. Though duplicative operations may be performed (e.g., that of the hardware device itself, and that which the OS causes using OS code), this ensures that the values in the register are protected even when a malicious OS is installed.

The hardware device may be configured to block untrusted memory-access instructions from accessing trusted cache blocks. The VM and OI metadata may be used to enforce an access control to the cache that couples validated instructions and validated data. The hardware device may retain data and code of different, potentially adversarial programs, at the same time in the cache unit and enforce desired access privileges at a cache block level granularity, and without requiring flushing cache content upon switching from one secure program to another. Furthermore, the same cache may be used to retain code and data of different protected programs that are also protected from each other, as well as unprotected data and code.

Keys may be retained in a key storage. In some exemplary embodiments, the key storage may retain secret cryptographic keys for encryption and decryption, signing and validation, alongside with an owner indication of each key. In some exemplary embodiments, only a designated component of the hardware device, such as a Security Management Unit (SMU) may read the content of the key storage. In some embodiments, the key storage may support write requests by the program, such as performed over a secure link. Additionally or alternatively, the key storage may contain pre-written keys that cannot be rewritten by anyone.

In some exemplary embodiments, the SMU may be configured to set the value of VM and OI. In some exemplary embodiments, the SMU may be configured to encrypt and decrypt data blocks when migrating from and to the cache unit. The SMU may sign blocks being migrated from the cache unit and perform the validation process when the block is fetched back into the cache.

One technical effect of the disclosed subject matter may be providing an efficient secure execution hardware-based platform. In some exemplary embodiments, the secure execution platform may be capable of hiding the register's data relatively fast, such as within about a single clock cycle. The disclosed subject matter may further provide for an efficient context switches without requiring cache manipulations upon context switches, let alone complete flushing of the cache. Such potentially significant overhead associated with switching from or to trusted code may therefore be avoided.

Another technical effect may be the ability to use general purpose code. In some exemplary embodiments, the security mechanisms may be hidden from the program. The programmer may not need to modify the application code to utilize an execution platform in accordance with the disclosed subject matter. The same cannot be said about other secure execution platforms, such as INTEL™ SGX™. In some exemplary embodiments, pre-processing may be performed so as to modify the code to allow for authorized code to communicate with unauthorized code, such as for invoking a system call and passing arguments thereto via registers, for initializing newly allocated memory that is allocated by the OS for the authorized program, or the like.

Yet another technical effect is providing the desired solution in a relatively simple manner, which requires minimal changes to external modules. In some exemplary embodiments, the disclosed subject matter monitors and controls some in-chip channels. The disclosed subject matter may rely on such in-chip channels, and avoid having to make any modification in the rest of the system. Such aspect may be of importance as it reduces development complexity and Quality Assurance (QA) efforts required for such embodiments.

The disclosed subject matter may provide for one or more technical improvements over any pre-existing technique and any technique that has previously become routine or conventional in the art.

Additional technical problems, solutions and effects may be apparent to a person of ordinary skill in the art in view of the present disclosure.

Referring now to FIG. 1, showing a block diagram of an apparatus, in accordance with some exemplary embodiments of the disclosed subject matter.

A Processor 100, or other similar apparatus, such as a microprocessor, an electronic circuit, an Integrated Circuit (IC) or the like, may be configured to execute instructions. Processor 100 may be coupled to Unprotected Memory 150, capable of retaining data in a computer-useable manner. In some exemplary embodiments, Unprotected Memory 150 may be a Random Access Memory (RAM). In some exemplary embodiments, Unprotected Memory 150 may retain data obtained from persistent long-term storage, such as a Hard Disk Drive (HDD), a Flash drive, a Network Attached Storage (NAS), or the like. For simplicity, but without limiting the disclosed subject matter to such embodiment, Unprotected Memory 150 is shown as being retained externally to Processor 100. However, the disclosed subject matter is not limited to such an embodiment, and in some cases, and Processor 100 may comprise Unprotected Memory 150 or portion thereof. It is further noted that the trusted portion of the memory, which is protected from unauthorized access thereto, may or may not reside on a single processor. In some cases, some protected memory may be retained externally to Processor 100. However, for the simplicity of the disclosure, the specification focuses on the embodiment where the trusted portion of the memory is retained on Processor 100.

Processor 100 may comprise Cache Unit 110. Cache Unit 110 may be a hardware cache used by the Processor 100. In some exemplary embodiments Cache Unit 110 may be utilized to store instructions and input data to such instructions or output data determined by such instructions. If data that is required by Processor 100 is not in Cache Unit 110 (e.g., cache miss), the data may be fetched and stored in a cache block within Cache Unit 110. Upon such fetching, a different cache block may be evicted, and potentially stored in secondary memory, such as Unprotected Memory 150. In some exemplary embodiments, Cache Unit 110 may be physically or virtually addressed. In some exemplary embodiments, Cache Unit 110 may be organized as a hierarchy of several cache levels (e.g., L1, L2, or the like). In some exemplary embodiments, some of the cache levels may not be trusted and may be handled similarly to Unprotected Memory 150. In some exemplary embodiments, in case there is more than one protected cache level, the level-to-level communication between protected cache levels may carry metadata alongside the actual blocks, such as VM and OI values. When crossing the boundary from an unprotected (and untrusted) cache level to a protected cache level, VM and OI may be computed. For simplicity, but without limiting the disclosed subject matter to such embodiment, the disclosure below addresses a cache unit having a single cache level.

In some exemplary embodiments, Cache Unit 110 retains in addition to the data in the cache blocks themselves additional metadata for each data block. Each data block in the cache may be associated with a VM, which may be a single bit. Additionally or alternatively, each data block in the cache may be associated with an OI. In some exemplary embodiments, the VM and OI may be stored alongside the cache block. Additionally or alternatively, the VM an OI may be stored separately from the cache block such as in a different protected storage module within Cache Unit 110.

In some exemplary embodiments, in order for the data in Cache Unit 110 to be useful for computations, the data may reside in the cache in an unencrypted manner.

Execution Unit 130 may be configured to execute instructions. The instructions may be fetched from Cache Unit 110. Data manipulation may be performed on Cache Unit 110 and registers, such as when executing load instruction (ld), store instruction (st), instructions that manipulate content of registers, or the like. In some exemplary embodiments, Execution Unit 130 retains registers. In some exemplary embodiments, the registers may be used to retain data that is loaded from memory, manipulated, or stored to memory, based on program instructions. In some exemplary embodiments, the registers may be viewed as indicating a machine state of the Processor 100. As the machine state of Processor 100 may provide useful insights into the operation of a protected program and potentially reveal data processed thereby, Execution Unit 130 may be configured to selectively hide content of the registers when a security domain is switched. The security domain may be defined by the VM and OI. For example, a first security domain is of a validated version of a program owned by a first owner. A second security domain is of an invalidated version of the program owned by the same first owner. A third security domain may be of a second owner.

In some exemplary embodiments, SMU 120 or portions thereof may be located in between Cache Unit 110 and Memory Controller 140. Upon a cache miss occurring in Cache Unit 110, SMU 120 may be requested to fetch a block into Cache Unit 110. SMU 120 may utilize Memory Controller 140 to obtain the data block from Unprotected Memory 150. SMU 120 may validate the identity content of the block by comparing a predetermined signature thereof with a signature SMU 120 computes. Based on such key-based validation process, VM of the cache block may be set. In some exemplary embodiments, SMU 120 may identify the owner and set the value of OI.

In some exemplary embodiments, SMU 120 may be configured to encrypt data blocks that are evicted from Cache Unit 110 and are transferred from the trusted area to untrusted memory area, such as Unprotected Memory 150. In some exemplary embodiments, SMU 120 may be configured to decrypt encrypted data blocks that are fetched into the Cache Unit 110. In some exemplary embodiments, SMU 120 may determine whether or not to decrypt the encrypted data blocks based on values of the VM, the OI, combination thereof, or the like.

In some exemplary embodiments, SMU 120 may utilize any memory encryption and authentication techniques that provide memory confidentiality and integrity breech indication. As an example, Message Authentication Code (MAC) may be used for signing data blocks. In some exemplary embodiments, a counter mode (CM) technique for memory encryption may be used. In some exemplary embodiments, CM encryption may protect the memory at cache block granularity by assigning a seed value (e.g., 64 bits) for each block's virtual address. In some exemplary embodiments, these seeds are cached. Additionally or alternatively, an integrity preserving structure (such as a hash tree) with an in-chip root value may be used to keep the integrity of the data blocks or CM seeds while in the untrusted memory. The root hash may be retained within a trusted area, such as located within the chip or externally thereto and coupled to SMU 120 via a secure channel. In some exemplary embodiments, integrity preserving structure may be a hash tree that is used for maintaining the integrity of the seeds, so that an old data block with its corresponding old seed cannot be injected into untrusted memory. In some exemplary embodiments, integrity preserving structure may be a hash tree that is used for maintaining the integrity of the data blocks, so that an old data block that may be injected into untrusted memory would be identified as a tampered-with block. The blocks of the integrity preserving structure may also be cached, so only missing nodes of the integrity preserving structure (rather than the entire hash tree) may need to be validated when fetched.

In some exemplary embodiments, CM encryption and the integrity preserving structure may require memory for metadata (e.g., encryption seeds and a hash tree). In some exemplary embodiments, the memory may not be protected, because an attacker is unlikely to successfully inject correct values without holding the secret keys. In some exemplary embodiments, these small regions may be allocated and zeroed at the secure program's request. In some exemplary embodiments, if the OS fails to cooperate, an error may be detected upon access. In some exemplary embodiments, SMU 120 may perform these operations using metadata (e.g., secret encryption and authentication keys) stored securely for each secure program during its setup.

It will be noted that although Processor 100 is generally considered hardware, some of its components may be implemented using software, firmware, or combination thereof. As a non-limiting example, SMU 120 may be partially implemented using software code to encrypt and decrypt data.

Figure 2:
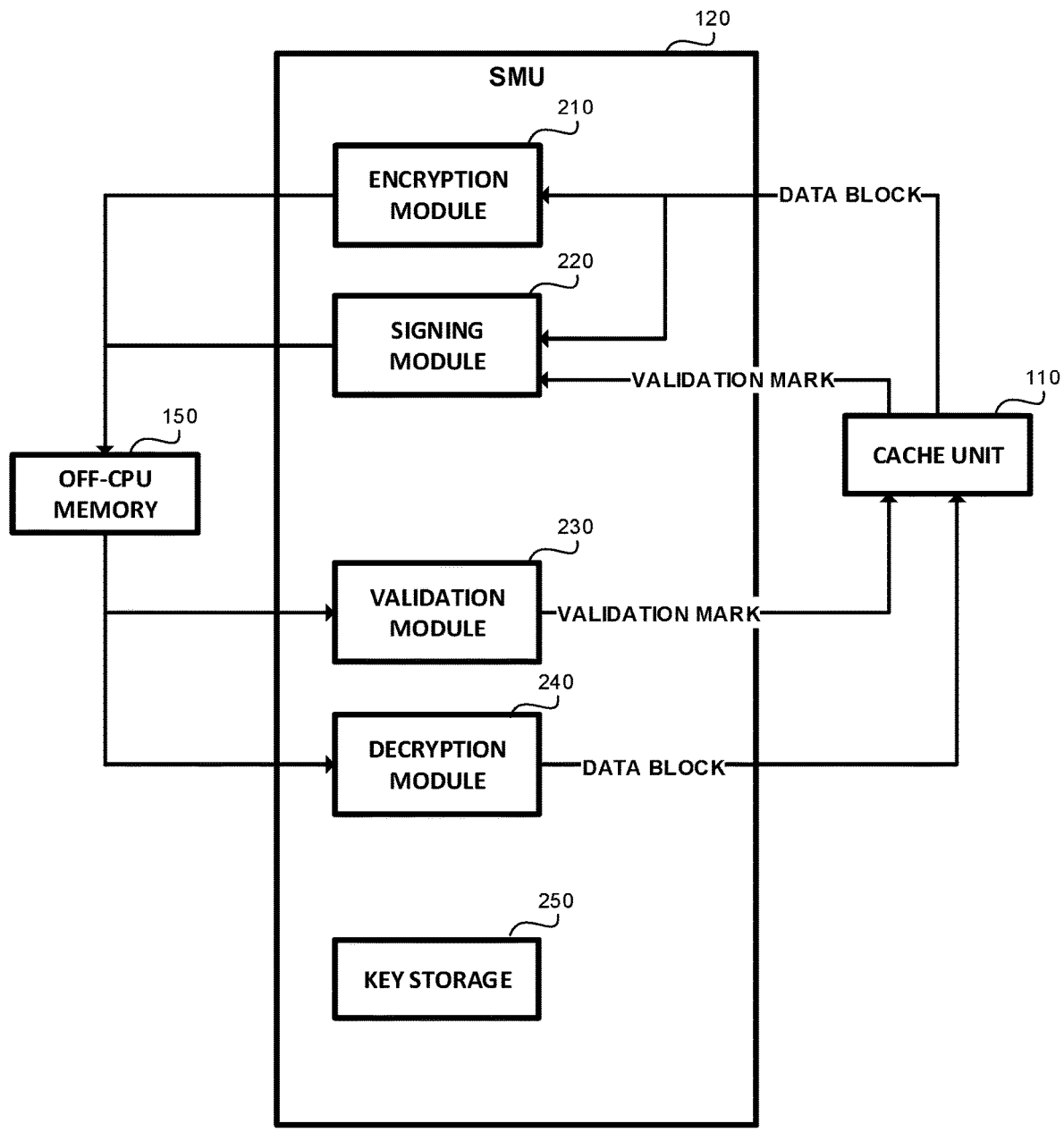
FIG. 2 shows a block diagram of a Security Management Unit (SMU), in accordance with some exemplary embodiments of the disclosed subject matter.

Referring now to FIG. 2 showing a block diagram of a SMU, in accordance with some exemplary embodiments of the disclosed subject matter. SMU 120 may comprise Key Storage 250 for retaining keys used by SMU 120, such as for encryption, decryption, signature creation or validation.

SMU 120 may be configured to receive a data block being evicted from Cache Unit 110 and encrypt the data block using Encryption Module 210. Encryption Module 210 may obtain a key from Key Storage 250 that is associated with the owner of the block being evicted (e.g., identified by OI). SMU 120 may be further configured to determine a signature of the block when being evicted, using Signing Module 220. The signature may be used to detect tampering and modification of the data block. Signing Module 220 may utilize a key associated with the owner and retained in Key Storage 250. In some exemplary embodiments, the Signing Module 220 may be configured to utilize an integrity preserving structure. Signing Module 220 may be configured to initiate updates to the integrity structure, such as in response to signing a newly evicted block from cache.

In some exemplary embodiments, SMU 120 may be configured to receive encrypted data block that is being fetched from Unprotected Memory 150 into Cache Unit 110. SMU 120 may determine whether the data block being fetched is of a protected program. If this is the case, the fetched block may be encrypted and SMU 120 may decrypt the fetched block. Decryption may be performed by Decryption Module 240, which may utilize a key associated with the owner and retained in Key Storage 250.

In some exemplary embodiments, Validation Module 230 may be configured to obtain the signature produced for the data block (e.g., by Signing Module 220, upon eviction thereof). Validation Module 230 may re-create the signature and compare it with the previously generated signature. If the signatures differ, it may be determined that the data block was tampered with. The VM of the cache block in which the data is stored, may be set to false accordingly. Otherwise, if the validation process was successful, VM is set to true. In some exemplary embodiments, Validation Module 230 may utilize a key associated with the owner and retained in Key Storage 250.

In some exemplary embodiments, SMU 120 may be configured to perform a responsive action to a tamper detection. As one non-limiting example, SMU 120 may abort the tampered-with-program (e.g., code of which or data associated therewith is identified as tampered). In some exemplary embodiments, SMU 120 may erase all data associated with the tampered-with-program. Additionally or alternatively, SMU 120 may issue a notification to a user, such as an owner of the tampered-with-program.

Figure 3:
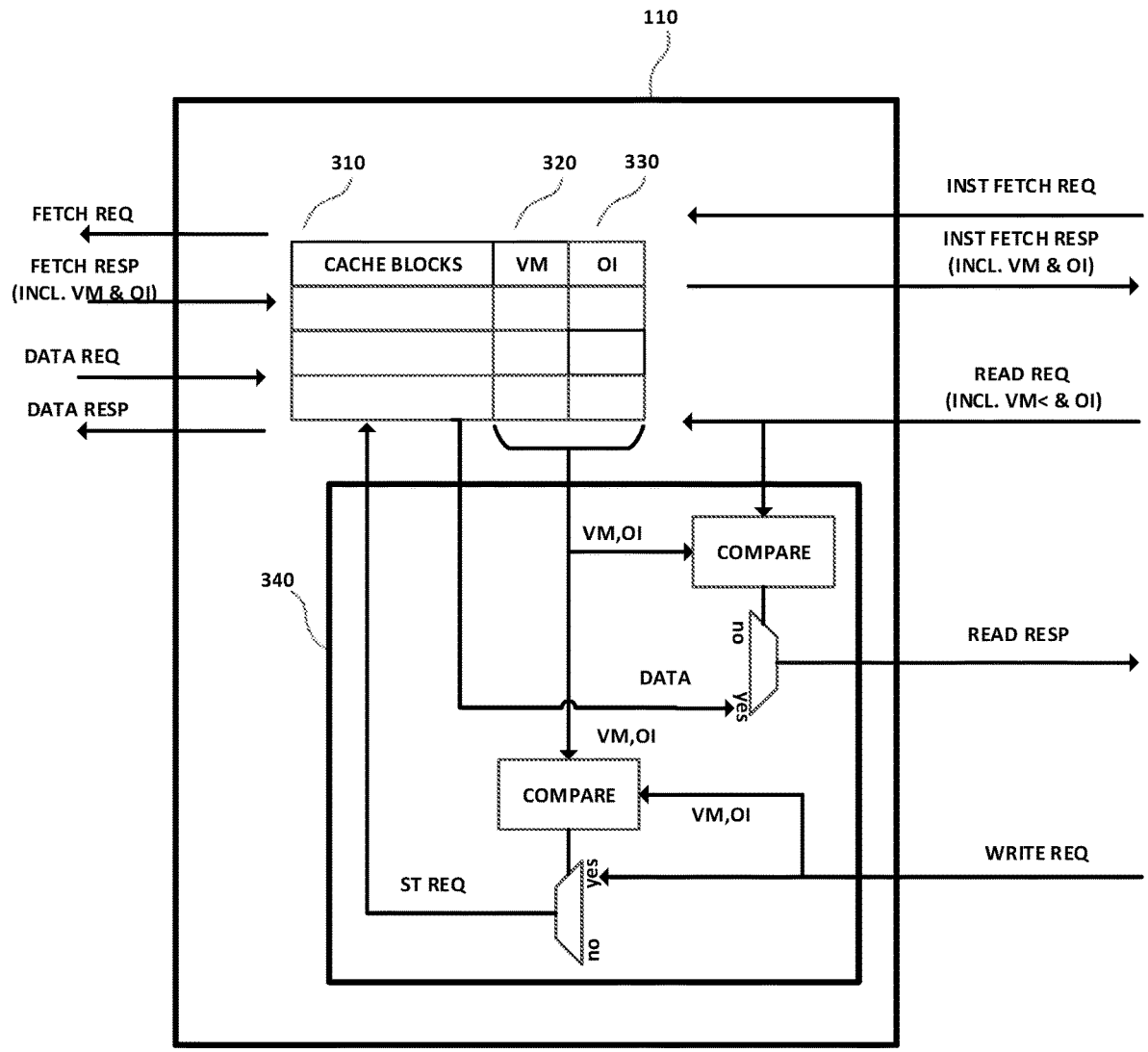
FIG. 3 shows a block diagram of a cache unit, in accordance with some exemplary embodiments of the disclosed subject matter.

Referring now to FIG. 3 showing a block diagram of a cache unit, in accordance with some exemplary embodiments of the disclosed subject matter.

Cache Unit 110 comprises a plurality of cache blocks (e.g., cache lines) (310). Each cache block is associated with a VM (320) and OI (330).

Upon fetching of an instruction or data into the cache, VM and OI values are also obtained, such as from SMU 120.

Access Control Block 340 may be configured to enforce access privileges based on VM and OI of the accessed cache block and that of the instruction performing the access. In some exemplary embodiments, Access Control Block 340 may be implemented within SMU 120, within Cache Unit 110, or the like. Access Control Block 340 is depicted as a digital electronic diagram, however, other implementations, such as using software or firmware, may be used. In some exemplary embodiments, instructions have the validation mark (VM1) and owner indicator (OI1) of its containing cache block. When an instruction tries to access memory (for either read or write), Access Control Block 340 compares the data block's validity mark (VM2) and owner indication (OI2) with those of the instruction (VM1, OI1), and only allows access if they both match.

In some exemplary embodiments, If VM1 and VM2 are both true, Access Control Block 340 may enforce OI1=OI2. In such a case, both the executed program and the accessed data are associated with protected security domains. Access would be allowed only if they both are associated with the same program.

In some exemplary embodiments, if VM1 and VM2 are both false, then access may be permitted. In some exemplary embodiments, such a case indicates both the program and the cache block are not protected and no restriction on access needs to be applied.

In some exemplary embodiments, if VM1 is false and VM2 is true, then access is restricted. In some exemplary embodiments, a non-validated instruction may be attempting to access validated and protected data. Such an access attempt may be blocked.

In some exemplary embodiments, when VM1 is true and VM2 is false, it may be indicative that a validated instruction attempts to access a non-validated data block. In some exemplary embodiments, access may be prevented.

In some exemplary embodiments, the access privileges may be bypassed in response to receiving an instruction for execution selected from a list of secure instructions. In some exemplary embodiments, some instructions may be a-priori deemed as secure instructions. Secure instructions may be allowed to access, when executed in protected mode, unprotected cache blocks. In some exemplary embodiments, the secure instructions may be instructions that are added on top of an Instruction Set Architecture (ISA) to form an extended ISA. The program may generally utilize the ISA and not the extended ISA. In some exemplary embodiments, pre-processing may be performed to ensure no secure instructions are used (e.g., the program uses the ISA and not the extended ISA). The program may be analyzed to automatically introduce secure instructions and utilize the extended ISA, where appropriate. As the program need not (and in some cases must not) utilize the extended ISA, but rather use the ISA, the program may be any program that was not specifically programmed to address the security issues addressed by the disclosed subject matter.

In some exemplary embodiments, in order to receive services by untrusted code, such as some OS system calls, a secure application may need to reveal some of its data. The secure instructions may allow trusted code to bypass the Secure Access mechanism. In some exemplary embodiments, secure instructions must be authentic (e.g., VM set) in order to run. In some exemplary embodiments, the secure instructions may comprise a secure store instruction configured to store data in a manner allowing it to be accessible to other entities other than an entity executing the secure store instruction. In some exemplary embodiments, the secure store instruction may be SMU_StoreNA(address, data). SMU_StoreNA may be configured to store data into a memory block regardless of its VM, and sets its VM bit to false, making it accessible to untrusted code. In some exemplary embodiments, the secure instructions may comprise a secure load instruction configured to load data stored by other entities other than an entity executing the secure load instruction. In some exemplary embodiments, the secure load instruction may be SMU_LoadNA(address). SMU_LoadNA may be configured to load data from a memory block regardless of its VM. SMU_LoadNA may be used for importing untrusted data by trusted code. In some exemplary embodiments, the secure instructions may comprise an initialization instruction configured to initialize allocated memory to be used by an entity having the same security domains as that of the entity executing the initialization instruction. In some exemplary embodiments, the initialization instruction may be SMU_InitA(addr, size). SMU_InitA may be configured to store zeros into an entire memory region of size size that starts at address addr. SMU_InitA may further be configured to set VM to true for in-cache blocks; and to sign and encrypt blocks that are not in cache. In some exemplary embodiments, the initialization instruction may be used for initializing allocated memory, after the memory was allocated by the OS for the process, so it is accessible by trusted code.

Figure 4:
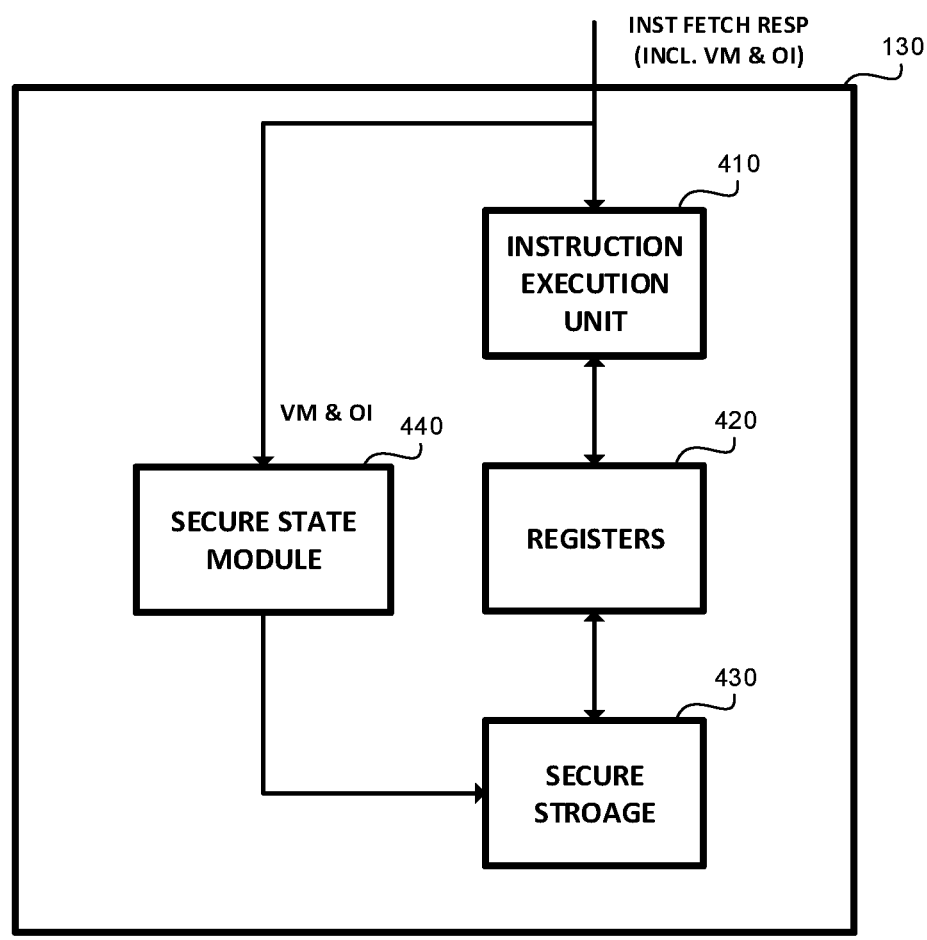
FIG. 4 shows a block diagram of an execution unit, in accordance with some exemplary embodiments of the disclosed subject matter.

Referring now to FIG. 4, showing a block diagram of an execution unit, in accordance with some exemplary embodiments of the disclosed subject matter.

Execution Unit 130 may comprise a Instruction Execution Unit 410 for performing the processing itself of Processor 100, SMU 120, Access Control Block 340, any portion thereof, or the like. Instruction Execution Unit 410 may be associated with an instruction set that is general and not specific for secured execution platforms. In some exemplary embodiments, Instruction Execution Unit 410 may utilize an extension of a general-purpose instruction set, such as including additional instructions used for specific purposes. In some exemplary embodiments, the programmer need not explicitly use any of the additional instructions, but rather, pre-processing may be performed to instrument the program with the additional instructions.

In some exemplary embodiments, the extension may include any of the following:

Setup and Results Instructions

SMU_GenKeys( ), which may be configured to generate a pair of public-private keys (PbK, PrK). In some exemplary embodiments, the return value may be PbK, signed by the SMU.

SMU_StoreKeys(PbK, enc[SymK && HashK], phash, FirstLEP), which may perform public key decryption enc[Skey && Mkey,by PbK] using PrK and store the keys, phash, and FirstLEP in a table entry.

SMU_SetPID(phash), which may report an error if no table entry with phash exists. Otherwise, the current PID may be set in the found entry. In some cases, SMU_SetPID may destroy any remnants of an existing SMU entry with the same PID, and purge such blocks in the cache.

SMU_GetResults(PID, rand), which may return PID's error status padded by rand and signed & encrypted with Skey & Mkey.

Context Switch Instructions

SMU_EvictContext( ), which may evict the content of the Secure Storage 430 to a memory location.

SMU_RestoreContext(PID), which may load the content of the Secure Storage 430 from a memory location.

New Load/Store Instructions

The new load/store instructions may be limited to be executable only if VM of the instructions is set.

SMU_StoreNA (address, data), which stores data into a memory block regardless of the block's VM, and resets its VM bit.

SMU_LoadNA (address), which loads data from a memory block whose VM is False.

SMU_InitA(addr, size), which fills a memory block with '0's regardless of its VM, and sets its VM bit. In some exemplary embodiments. SMU_InitA may be used along with write-no-allocate instruction.

SMU_syscall (argnum), which may call a system call, and leaves argnum register-arguments in place on mode change.

Instruction Execution Unit 410 may be coupled to Registers 420. Registers 420 may be capable of retaining data. Instruction Execution Unit 410 may be configured to load data into registers, perform arithmetic operations and manipulations on the content of the registers using machine instructions. Registers 420 may therefore reveal information regarding the processed data, outcome, code or the like. In some exemplary embodiments, Registers 420 may comprise an instruction pointer or program counter indicating a next instruction to be executed. Content of Registers 420 may be viewed as a state of Instruction Execution Unit 410.

In some exemplary embodiments, instructions are fetched into Execution Unit 130 along with the VM and OI of its containing cache block. The Secure State Module 440 may track whether Execution Unit 130 is operating in trusted or untrusted mode. Execution Unit 130 may operate in trusted mode when execution an instruction having its VM set to true. In some exemplary embodiments, Secure State Module 440 may retain the OI and VM of the last instruction fetched for execution (denoted as {VM_last, OI_last}). When a new instruction, inst1, with {VM1,OI1} is fetched into the execution unit, {VM1,OI1} are compared with {VM_last, OI_last}. If different (e.g., (VM_last≠VM1 or OI_last≠OI1), then the execution of instr1 may be delayed until the content of Registers 420 is copied to Secure Storage 430 with an ID={VM_last,OI_last} (hereafter context{VM_last,OI_last}), and erased from Registers 420. Values of Registers 420 may be restored to the ones stored in Secure Storage 430 with ID={VM1,OI1} (context{VM1,OI1}), if exists; if doesn't exist, then the values of Registers 420 are partially or fully reset to a predefined value, and some of their values may be preserved.

In some exemplary embodiments, when Secure State Module 440 changes to untrusted mode, the Secure State Module 440 may first store the contents of Registers 420 in the Secure Storage 430, clears them, and changes the stack pointer to the non-secure memory region that acts as the non-secure stack. In some exemplary embodiments, clearing the content of Registers 420 may comprise deleting their values, modifying their values so as to change their content, setting values of the registers to default values, or the like. In some exemplary embodiments, Secure State Module 440, Secure Storage 430, or the like, may store the address of the next authentic instruction to execute, referred to as Legal Entry Point (LEP), the Process Identifier (PID) of the running process, and set a validity mark for the content of the Secure State Module 440. Then, the non-authentic (untrusted) code may execute safely. In some exemplary embodiments, an attempt to execute an authentic instruction in untrusted mode only succeeds if its address matches the process' LEP and the data in the Secure Storage 430 is valid and matches the PID. If so, the Secure State Module 440 may restore the values of Register 420 and the secure stack pointer (the secret context) from the Secure Storage 430, and changes the process to trusted mode; else the program halts and an error is declared. In both cases, the content of Secure Storage 430 is invalidated. By so doing, the SMU verifies that the secure program has resumed from its expected point of execution with the correct register values. In some exemplary embodiments, upon initiating a secure program, the Secure State Module 440 may create an empty secret context in the Secure Storage 430; only during the first switch to trusted mode, the register values are preserved, but the entry point may be enforced.

In some exemplary embodiments, for some groups of IDs (e.g., ID={VM=false,OI=*}) Registers 420 need not to be saved for restoration (e.g. always save and restore zero).

In some preferred embodiments, Secure State Module 440 may condition content restoration upon the values of some attributes of inst1 (e.g. only restore context{VM1,OI1} for instr1, if context{VM1,OI1}.RegisterX==instr1(address), or a predefined offset to it).

In some exemplary embodiments, only a proper subset of Registers 420 may be erased, and a remaining proper subset of Registers 420 may be available to a next instruction of a different security domain. In some exemplary embodiments, some Registers 420 may be used to pass arguments to statically linked shared library functions, system calls, or the like. In such a case, values of some of the Registers 420 may be preserved. In some cases, the instruction may be analyzed on the fly to determine whether, which and how many registers are being so used. Additionally or alternatively, automated pre-processing may be performed to replace the instruction with a designated instruction that statically indicates the number of registers to be preserved, such as SMU_syscall(argnum), discussed above. In some exemplary embodiments, when returning to trusted mode for the same program, the content of the registers that were not preserved may not be restored.

Figure 5A:
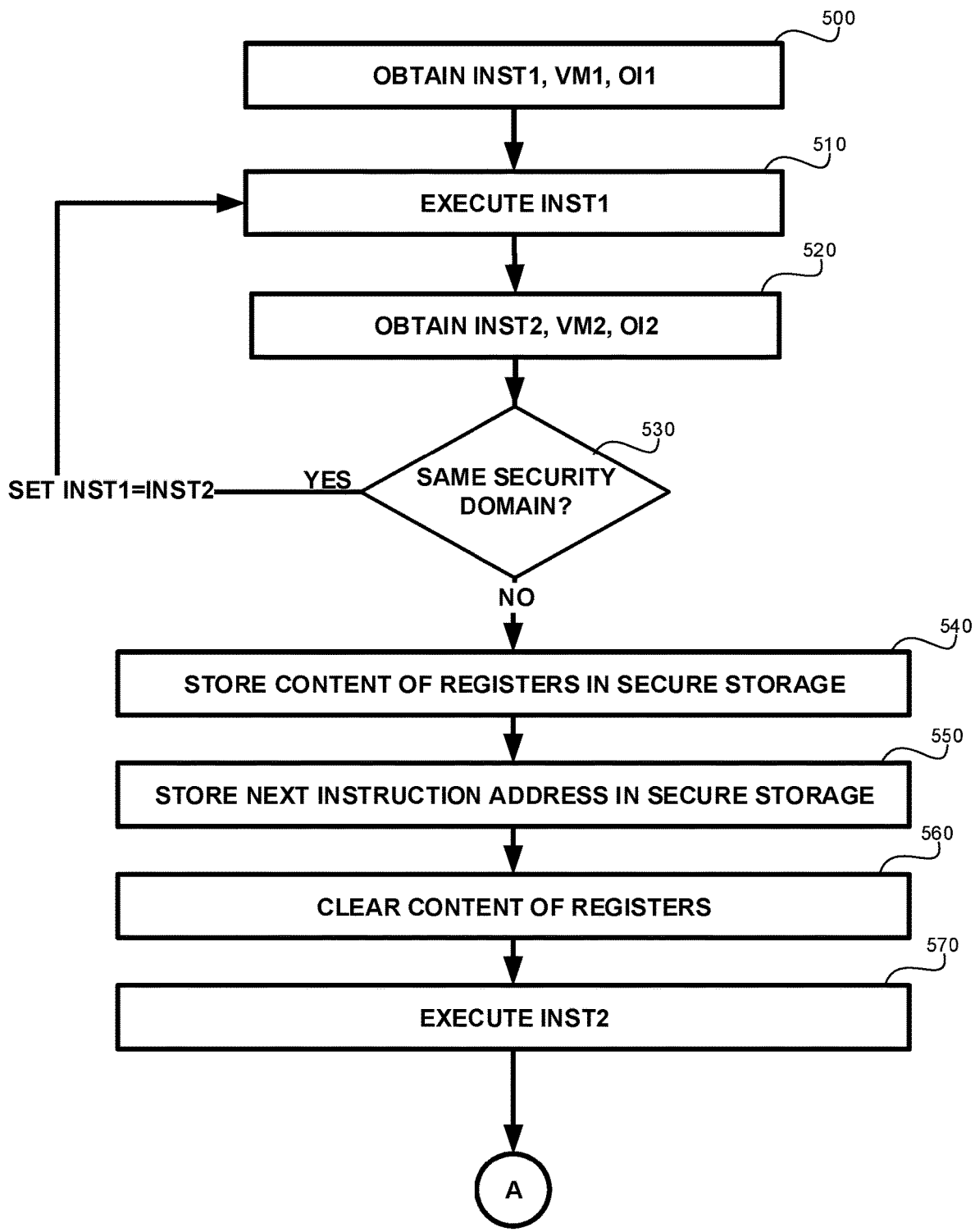
FIGS. 5A-5B and 6 show flowchart diagrams of methods, in accordance with some exemplary embodiments of the disclosed subject matter.
Figure 5B:
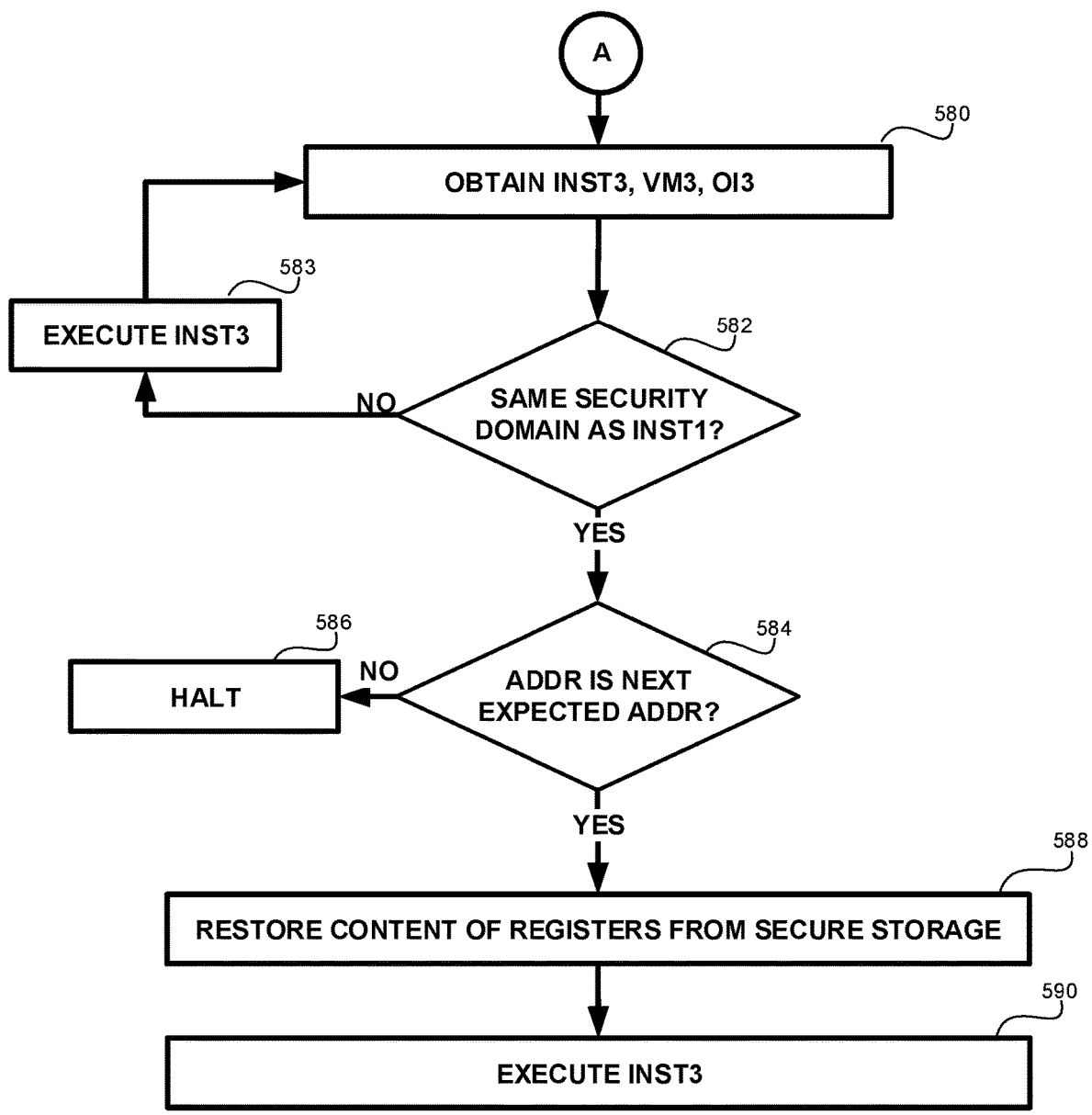

Referring now to FIGS. 5A-5B showing a flowchart diagram of a method in accordance with the disclosed subject matter.

In Step 500, a first instruction to be executed is obtained from the cache, together with its VM and OI (VM1, OI1). In some exemplary embodiments, the VM indicates that the instruction is executed within a security domain of OI1.

In Step 510, the first instruction is executed by the execution unit. As a result of the execution of the first instruction, the registers may be updated and their content may reflect the data used or produced by the program.

In Step 520, a second instruction to be executed is obtained, together with its VM and OI (VM2, OI2).

If the security domain of the second instruction is the same as that of the first instruction, Step 510 may be repeated with the second instruction (i.e., execute the second instruction). After such execution, an additional instruction may be obtained. In case the security domain is different (530), Step 540 may be performed.

In Step 540, content of the registers may be stored in a secure storage, in accessible to instructions executed by the execution unit. In some exemplary embodiments, only a proper subset of the registers may be stored, such as by omitting several registers that are used by the first instruction to intentionally provide information to the second instruction. In some exemplary embodiments, the determination of the subset may be based on the second instruction, which may explicitly or implicitly indicate which registers' values should be maintained in the second security domain. In some exemplary embodiments, an indication of which registers were stored may be stored as well, and used to selectively restore only the content of the registers which was stored.

In Step 550, a next instruction address may be determined and stored in the secure storage. The next instruction address, also referred to as Legal Entry Point (LEP), may be determined based on the value of the instruction pointer.

In Step 560, content of the registers may be cleared. In some exemplary embodiments, content of some registers may be maintained, such as the registers indicated to be used for passing arguments to the different security domain.

In Step 570, the second instruction may be executed. Because the second instruction is executed after the registers are cleared, there is no unintentional data leakage through the registers.

For completeness it is noted, that prior to executing the second instruction, values of the registers for the security domain may be restored, such as explained with respect to Steps 582-588. In some exemplary embodiments, the register values for each register whose content was cleared may be restored, if the value of the register for the security domain is stored within the secure storage, such as because before the first instruction was executed, the active security domain was that of the second instruction.

In Step 580, a third instruction, along with its VM and OI may be obtained.

Instructions may be obtained and executed as long as the same security domain is maintained (Loop 580-582-583-580). For example, if the security domain is of the same protected program, instructions may be executed repeatedly. As another example, if the security domain is unprotected program then, regardless of the owner of the instructions, all instructions may be executed until reaching a first instruction of a protected program. For clarity of the disclosure, it is assumed that when a different security domain is identified, it is the security domain of the first instruction.

In Step 584, the address of the third instruction is compared with the LEP for the security domain. If the address is different than the LEP, there is a risk of a program flow tampering attempt, and execution may be halted (586). Additionally or alternatively, an owner of the program may be notified and informed of the identified risk.

In Step 588, and in case the address matches the LEP, content of the registers is restored. The content is retrieved from the secure storage and set to the registers, thereby restoring the machine state of the processor. In case no value was stored for some of the registers, the content of such registers may not be updated and it may persist from the previous security domain. In some cases, the content may only persist if the previous security domain was an unsecure domain. In some cases, the value of the last unsecure domain may be restored, thereby restoring the latest content of the register which the present security domain is privileged to access.

In Step 590, the third instruction is executed.

Figure 6:
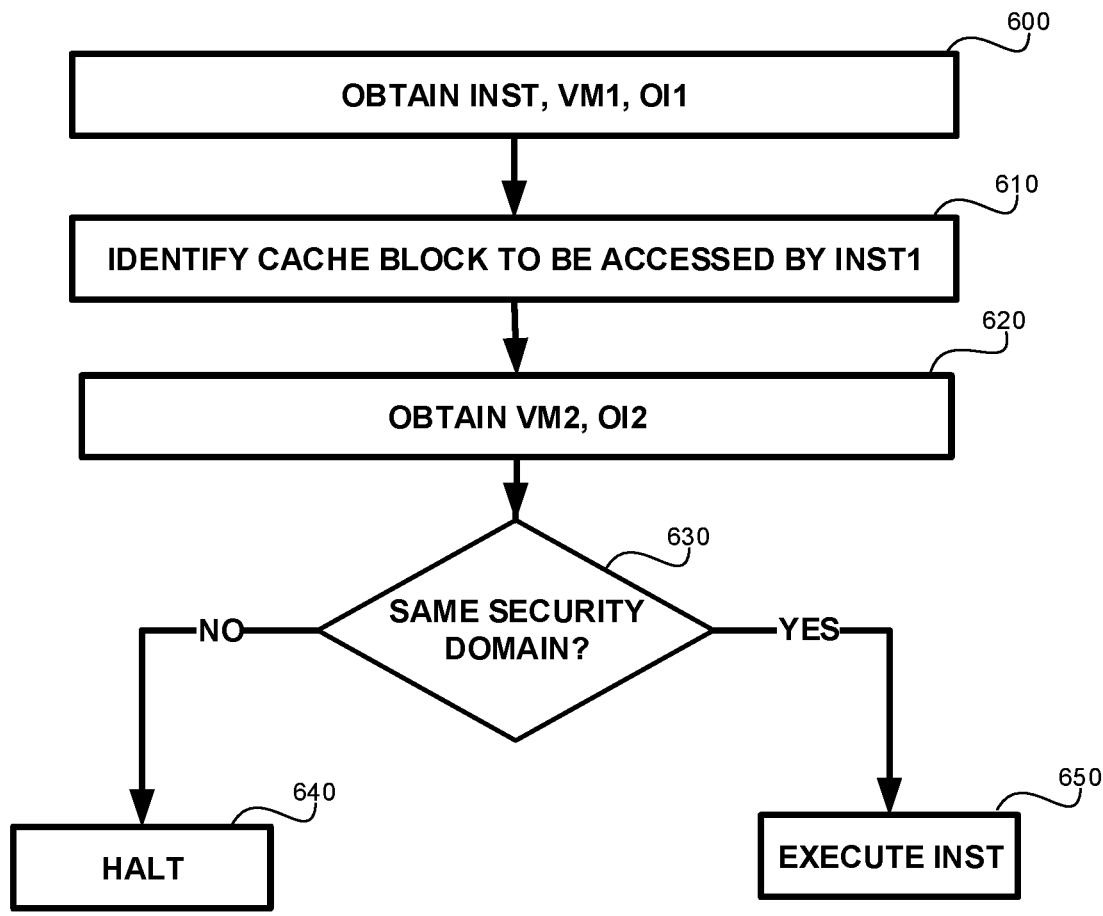

Referring now to FIGS. 6 showing a flowchart diagram of a method in accordance with the disclosed subject matter.

In Step 600, an instruction is obtained together with VM1 and OI1. In some exemplary embodiments, the instruction may access a memory block.

In Step 610, a cache block to be accessed by the instruction is identified.

In Step 620, VM2 and OI2 of the identified cache block is retrieved.

In Step 630, it is determined whether the security domain of {VM1,OI1} is the same as that of {VM2,OI2}. If so, the instruction is executed (650). Otherwise, a tampering attempt is detect, whether tampering with the code or data of the protected program, or an attempt to access the data of the protected program by another program. Execution may be halted (640) to prevent potential data leakage. Additionally or alternatively, an event may be logged, or otherwise a record may be retained. In some cases, the user may be notified of such an event.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A cache unit comprising computer readable medium, wherein said cache unit is configured to retain:
    a plurality of cache blocks;
    a plurality of owner indicators, wherein for each cache block of the plurality of cache blocks exists a corresponding owner indicator in the plurality of owner indicators, wherein an owner indicator corresponding to a cache block is capable of identifying an entity that caused the cache block to be fetched to the cache unit, wherein a first dataset and a second dataset concurrently reside unencrypted in the plurality of cache blocks, wherein the first dataset is associated with a first entity, wherein the second dataset is associated with a second entity, wherein the second entity is prohibited from accessing the first dataset, wherein the first dataset comprises one or more cache blocks comprising program instructions that are to be executed by the first entity, and wherein the first dataset comprises one or more cache blocks comprising data that is written by the first entity; and
    a plurality of validity marks, wherein for each cache block of the plurality of cache blocks exists a corresponding validity mark in the plurality of validity marks, wherein a validity mark corresponding to the cache block indicates whether a validation process that was performed on the cache block upon fetching thereof was successful.

2. The cache unit of claim 1 further comprising a key storage retaining a plurality of keys, each of which is associated with a different entity, wherein the validation process is performed using a key retained in the key storage, wherein the key is associated with the entity, wherein the key storage and the plurality of cache blocks are retained in a secure storage.

3. An apparatus comprising the cache unit of claim 1, wherein said apparatus further comprising a Security Management Unit (SMU), wherein said SMU is configured to perform the validation process upon said fetching of the cache block into the cache unit.

4. The apparatus of claim 3, wherein said SMU is further configured to sign the cache block upon an eviction of the cache block from the cache unit, to thereby produce a signature, wherein the validation process is based on the signature produced by said SMU upon the eviction.

5. An apparatus comprising the cache unit of claim 1, wherein said apparatus further comprising a Security Management Unit (SMU) and a computer-useable medium, wherein said SMU is configured to assign and set values to the plurality of validity marks and to the plurality of owner indicators during fetching of corresponding data blocks into said cache unit, wherein said SMU is configured to encrypt the cache block upon eviction of the cache clock from said cache unit into the computer-useable medium, and wherein said SMU is configured to decrypt a data unit upon fetching the data unit from the computer-useable medium into said cache unit.

6. The apparatus of claim 5, wherein said SMU is configured to encrypt the cache block upon the eviction from said cache unit only in response to the cache block being associated with the validity mark indicating a successful validation process of the cache block.

7. An apparatus comprising a cache unit, the cache unit comprising computer readable medium, wherein said cache unit is configured to retain:
a plurality of cache blocks;
a plurality of owners indicators, wherein for each cache block of the plurality of cache blocks exists a corresponding owner indicator in the plurality of owners indicators, wherein an owner indicator corresponding to a cache block is capable of identifying an entity that caused the cache block to be fetched to the cache unit; and
a plurality of validity marks, wherein for each cache block of plurality of cache blocks exists a corresponding validity mark in the plurality of validity marks, wherein a validity mark corresponding to the cache block indicators whether a validation process that was performed on the cache block upon fetching thereof was successful,
wherein said apparatus further comprises a Security Management Unit (SMU), wherein said SMU is configured to utilize the plurality of owner indicators and the plurality of validity marks to enforce access privileges to the plurality of cache blocks.

8. The apparatus of claim 7, wherein a first dataset and a second dataset concurrently reside unencrypted in the plurality of cache blocks, wherein the first dataset is associated with a first entity, wherein the second dataset is associated with a second entity, wherein the second entity is prohibited from accessing the first dataset.

9. The apparatus of claim 8, wherein the first entity is prohibited from accessing the second dataset.

10. The apparatus of claim 8, wherein the first dataset comprises one or more cache blocks comprising program instructions that are to be executed by the first entity, and wherein the first dataset comprises one or more cache blocks comprising data that is written by the first entity.

11. The apparatus of claim 7, wherein said SMU is configured to bypass the access privileges in response to receiving an instruction for execution selected from a list of secure instructions.

12. The apparatus of claim 11, wherein the list of secure instructions comprises:
a secure store instruction configured to store data in a manner allowing it to be accessible in security domains different than a security domain in which the secure store instruction is executed;
a secure load instruction configured to load data stored in security domains different than a security domain in which the secure load instruction is executed; and
an initialization instruction configured to initialize allocated memory to be used by an entity executing the initialization instruction.

13. An apparatus comprising a cache unit, the cache unit comprising computer readable medium, wherein said cache unit is configured to retain:
a plurality of cache blocks;
a plurality of owners indicators, wherein for each cache block of the plurality of cache blocks exists a corresponding owner indicator in the plurality of owners indicators, wherein an owner indicator corresponding to a cache block is capable of identifying an entity that caused the cache block to be fetched to the cache unit; and
a plurality of validity marks, wherein for each cache block of plurality of cache blocks exists a corresponding validity mark in the plurality of validity marks, wherein a validity mark corresponding to the cache block indicators whether a validation process that was performed on the cache block upon fetching thereof was successful,
wherein said apparatus further comprising a Security Management Unit (SMU), wherein said SMU is configured to enforce access privileges that couple instructions and data retained in the plurality of cache blocks using the plurality of owner indicators and the plurality of validity marks.

14. An apparatus comprising a cache unit, the cache unit comprising computer readable medium, wherein said cache unit is configured to retain;
a plurality of cache blocks;
a plurality of owner indicators, wherein for each cache block of the plurality of cache blocks exists a corresponding owner indicator in the plurality of owner indicators, wherein an owner indicator corresponding to a respective cache block is capable of identifying an entity that caused the respective cache block to be fetched to the cache unit; and
a plurality of validity marks, wherein for each cache block of the plurality of cache blocks exists a corresponding validity mark in the plurality of validity marks, wherein a validity mark corresponding to the respective cache block indicates whether a validation process that was performed on the respective cache block upon fetching thereof was successful, wherein said apparatus further comprising an execution unit, wherein said execution unit comprises a set of registers for retaining values, wherein the set of registers are configured to be used during execution of instructions by said execution unit;

wherein said execution unit is configured to receive an instruction, an instruction validity mark, and an instruction owner indicator, wherein the instruction is an instruction to be executed by said execution unit and configured to read from a cache block in the plurality of cache blocks, wherein the instruction validity mark is a validity mark that corresponds the cache block, and wherein the instruction owner indicator is an owner indicator that corresponds the cache block; and wherein said execution unit is configured to erase content in at least a portion of the set of registers based on at least one of the instruction validity mark and the instruction owner indicator.

15. The apparatus of claim 14, wherein said execution unit is configured to erase the content in at least the portion of the set of registers based on the instruction validity mark indicating an unsuccessful validation process of the instruction.

16. The apparatus of claim 14, wherein said execution unit is configured to erase the content in at least the portion the set of registers based on the instruction owner indicator indicating a different owner than a second instruction owner indicator associated with a previous instruction preceding the instruction.

17. The apparatus of claim 14 further comprising a secure storage, wherein said execution unit is configured to copy the content of the at least the portion of the set of registers to said secure storage prior to erasing the content, wherein said execution unit is configured to restore the content of the at least the portion of the set of registers from said secure storage in response to receiving a second instruction, a second instruction validity mark and a second owner indicator, based on the second instruction validity mark indicating a successful validation process of the second instruction and based on the second owner indicator indicating a same owner as a third owner indicator that is associated with a third instruction preceding the instruction.

18. The apparatus of claim 17, wherein said execution unit is configured to verify that an attribute of the second instruction matches an expected attribute, before restoring the content of the at least a portion of the set of registers.

19. The apparatus of claim 18, wherein the attribute of the second instruction is an address of the second instruction, and wherein the expected attribute is an expected next address.

20. The apparatus of claim 14, wherein the content is values of a proper subset of the set of registers, whereby protecting values the portion of the set of registers excluding the proper subset from being accessed by unauthorized instructions, and whereby enabling passing of arguments from secure domain to unsecure domain via the proper subset.

21. A method comprising:
obtaining an instruction for execution from a first cache block;
obtaining a first validity mark and a first owner indicator associated with the first cache block;
in response to the instruction, when executed, attempting to access a second cache block:
obtaining a second validity mark and a second owner indicator associated with the second cache block;
determining an access privilege of the instruction to the second cache block based on at least two of the first validity mark, the first owner indicator, the second validity mark and the second owner indicator; and
enforcing the access privilege.

22. The method of claim 21, wherein said determining the access privilege comprises determining to prevent access in response to at least one of the following:
the first validity mark and the second validity mark indicate successful validation and the first owner indicator is different than the second owner indicator;
the first validity mark indicates unsuccessful validation and the second validity mark indicates successful validation; and
the first validity mark indicates successful validation, the second validity mark indicates unsuccessful validation and the instruction is not selected from a predetermined group of secure instructions.

23. A method performed by a processor, wherein the processor comprising a cache unit retaining a plurality of cache blocks and a set of registers, wherein said method comprising:
obtaining a first instruction for execution from a first cache block;
obtaining a first validity mark and a first owner indicator associated with the first cache block;
determining a first security domain based on the first validity mark and the first owner indicator;
executing the first instruction to set a first state of the processor;
obtaining a second instruction for execution from a second cache block;
obtaining a second validity mark and a second owner indicator associated with the second cache block;
determining a second security domain based on the second validity mark and the second owner indicator;
in response to determining the second security domain is different than the first security domain:
storing, in a secure storage, content of at least a portion the set of registers;
storing, in a secure storage, an address of next instruction in the first security domain; and
after said storing content and storing the address, modifying the content of the at least a portion of the set of registers;
after said modifying, executing the second instruction to set a second state of the processor;
obtaining a third instruction for execution from a third cache block;
obtaining a third validity mark and a third owner indicator associated with the third cache block;
determining a third security domain based on the third validity mark and the third owner indicator;
in response to determining the third security domain is the first security domain:
restoring, from the secure storage, the content of the at least portion of the set of registers, thereby restoring the first state of the execution unit; and
verifying an address of the third instruction matches the address of the next instruction in the first security domain retained in the secure storage; and
executing the third instruction on the first state of the execution unit.

* * * * *

UNITED STATES PATENT AND TRADEMARK OFFICE
CERTIFICATE OF CORRECTION

| | |
|---|---|
| PATENT NO. | : 11,474,954 B2 |
| APPLICATION NO. | : 16/625018 |
| DATED | : October 18, 2022 |
| INVENTOR(S) | : Shwartz et al. |

It is certified that error appears in the above-identified patent and that said Letters Patent is hereby corrected as shown below:

In the Claims

Column 19, Lines 54 through 55, in Claim 7 should be:
a validity mark corresponding to the cache block indicates whether a validation process that was performed Signed and Sealed this
Twentieth Day of June, 2023

Katherine Kelly Vidal
*Director of the United States Patent and Trademark Office*